Jan. 12, 1954
C. D. GREEN
2,665,903
DEVICE FOR COMBINING THE SHOCK-ABSORBING
AND LIMITING ACTION IN COUPLINGS
Filed Aug. 28, 1951
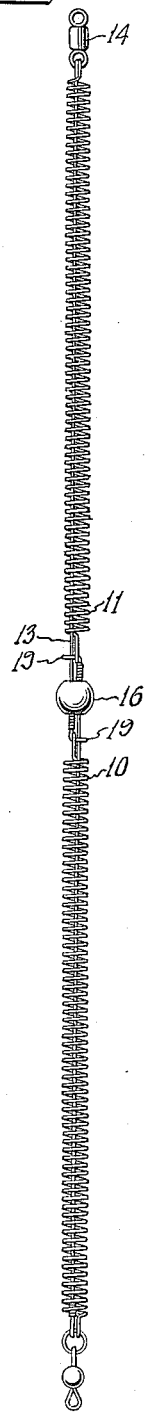
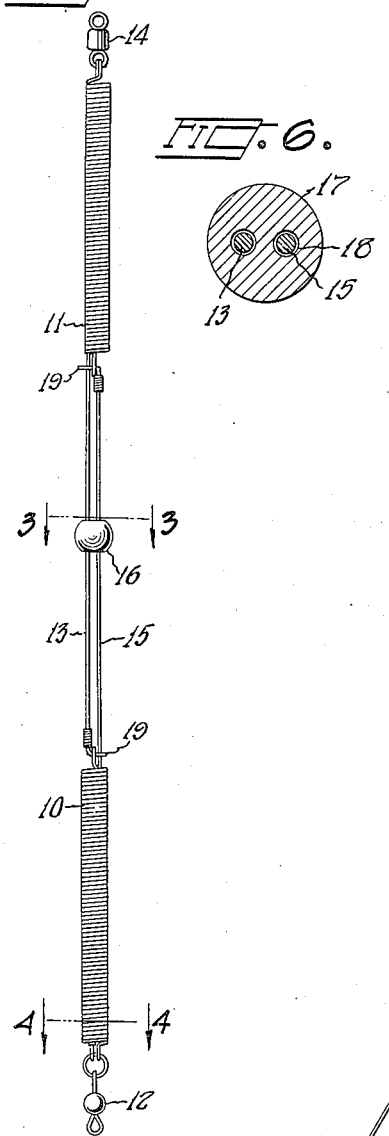
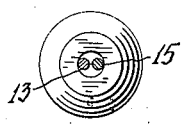
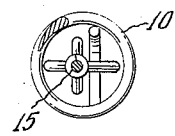
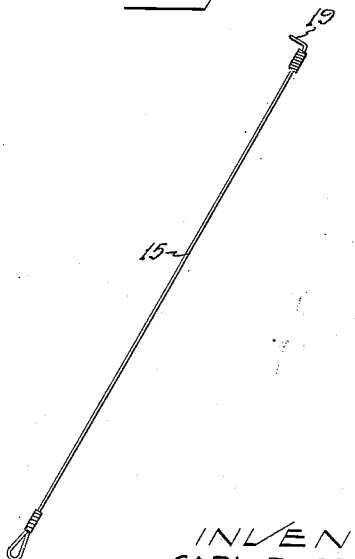
INVENTOR
CARL D. GREEN
BY
ATTORNEY Patented Jan. 12, 1954

2,665,903

UNITED STATES PATENT OFFICE 2,665,903

DEVICE FOR COMBINING THE SHOCK-ABSORBING AND LIMITING ACTION IN COUPLINGS

Carl D. Green, Brush Prairie, Wash.

Application August 28, 1951, Serial No. 244,053

3 Claims. (Cl. 267—73)

This invention relates generally to spring tensioning devices.

The main object of this invention is to provide a device for combining the shock-absorbing and limiting action in a coupling.

A further object is to so unite springs in tandem that their strength is added and that the resistance is improved.

I accomplish these and other objects in the manner set forth in the following specification as illustrated in the accompanying drawing, in which:

Fig. 1 is a side elevation of the device not under tension.

Fig. 2 is a similar view showing it under full load.

Fig. 3 is a section taken along the line 3—3 in Fig. 1.

Fig. 4 is a section taken along the line 4—4 in Fig. 1.

Fig. 5 is a side elevation of a wire link.

Fig. 6 is a section through a modified form of runner.

Like numbers of reference refer to the same or similar parts throughout the several views.

Referring in detail to the drawing there is shown a pair of helical springs 10 and 11 arranged in tandem but coupled in parallel; that is to say, that while the spring 10 is attached at one end to the coupling 12, it is connected at the other end by a link 13 passing through the spring 11 to the coupling 14. The spring 11, on the other hand, is attached at one end to the coupling 14 and at its other end to a second link 15 passing through the spring 10 to the coupling 12.

A runner or collar 16 encircles both of the links 13 and 15 and holds the links against separation or fouling.

While the use of springs for this purpose, including the use of link 13 or 15, is well understood, it is thought that certain advantages arise from my construction including the adding of the strength of the springs together with the equalizing and stopping action of the runner.

While a common use of the device would be in fishing tackle, it has, of course, a wide variety of applications wherever spring tensioning or shock-absorbing devices are required.

In Fig. 6 is shown a runner 17 with two openings 18 for the links 13 and 15. Such runners are used with heavier units where the space between the adjacent ends is greater than it would be in smaller units and in which the chances of fouling are much greater than in the smaller units.

It will be noted that each link 13 and 15 has a laterally turned eye 19 through which the other link is passed and in which it guides.

I claim:

1. A pair of helical springs arranged in tandem and coupled in parallel, the adjacent ends of the two springs each having a link attached thereto and extending through the opposite spring to the end fastening thereof and a runner encircling both links through which they may slidably pass.

2. A pair of helical springs arranged in axial alignment and spaced from each other, each spring having a link attached to its outermost end and to the innermost end of the other spring, and means for limiting the approach of the innermost ends of the springs.

3. A spring tensioning device comprising a pair of helical springs arranged in axial alignment, each of said springs having a link extending from its outer end along its axis and fastening to the inner end of the other spring in which a load on the device will draw the innermost ends of the springs together and a runner through which both links pass, one end of each link guiding on the other link.

CARL D. GREEN.

References Cited in the file of this patent

UNITED STATES PATENTS

| Number | Name | Date |
|---|---|---|
| 1,723,814 | Scholl | Aug. 6, 1929 |
| 2,189,979 | Fender | Feb. 13, 1940 |

FOREIGN PATENTS

| Number | Country | Date |
|---|---|---|
| 18,398 | Great Britain | 1905 |